(12) United States Patent
Beauvilain et al.

(10) Patent No.: US 8,579,079 B2
(45) Date of Patent: Nov. 12, 2013

(54) SOUNDPROOFING PANEL

(75) Inventors: Thierry Beauvilain, Varennes Changy (FR); David Maupetit, Griselles (FR); Sylvie Fageardie, Amilly (FR); Benoît Palluau, Saint German des Prés (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 12/936,779

(22) PCT Filed: Apr. 6, 2009

(86) PCT No.: PCT/FR2009/000402
§ 371 (c)(1),
(2), (4) Date: Dec. 23, 2010

(87) PCT Pub. No.: WO2009/144404
PCT Pub. Date: Dec. 3, 2009

(65) Prior Publication Data
US 2011/0186380 A1 Aug. 4, 2011

(30) Foreign Application Priority Data
Apr. 7, 2008 (FR) .................................. 08 01916

(51) Int. Cl.
*E04B 1/84* (2006.01)
(52) U.S. Cl.
USPC .............................. 181/290; 181/292; 52/145
(58) Field of Classification Search
USPC ............ 181/288, 290, 292, 293; 52/144, 145
See application file for complete search history.

(56) References Cited

U.S. PATENT DOCUMENTS

| | | | |
|---|---|---|---|
| 1,865,424 A | | 7/1932 | Banta |
| 2,140,210 A | * | 12/1938 | Schenk .......................... 181/291 |
| 3,078,948 A | * | 2/1963 | Lemmerman et al. ......... 181/292 |
| 3,095,943 A | * | 7/1963 | Kemp ............................ 181/292 |
| 3,483,947 A | * | 12/1969 | Sulewsky ...................... 181/290 |
| 4,130,682 A | | 12/1978 | Lauko |
| 4,276,954 A | * | 7/1981 | Romano ........................ 181/224 |
| 4,487,291 A | * | 12/1984 | Walker .......................... 181/290 |
| 4,555,433 A | * | 11/1985 | Jablonka et al. .............. 428/166 |

(Continued)

FOREIGN PATENT DOCUMENTS

| | | |
|---|---|---|
| DE | 103 41 158 A1 | 5/2005 |
| EP | 1 612 768 A1 | 1/2006 |

(Continued)

OTHER PUBLICATIONS

International Search Report from International Appl. No. PCT/FR2009/000402, mailed Dec. 15, 2009.
Written Opinion from International Appl. No. PCT/FR2009/000402, mailed Dec. 15, 2009.

*Primary Examiner* — Jeremy Luks
(74) *Attorney, Agent, or Firm* — Alston & Bird LLP

(57) ABSTRACT

The aim of the invention is to improve acoustic insulation panels of the prior art by proposing a rigid, light panel, the acoustical absorption performance of which is improved thanks to the use of a grid the structure of which enables the same to contribute to the noise absorption function. To this end, the present invention relates to an acoustic insulation panel including two facing panels (2, 4), separated by a solid structure (6) that is substantially planar and has two surfaces (7*b*, 7*c*) that are substantially planar and parallel, each of which are rigidly connected to a facing panel, said structure (6) including through-holes (6*a*) that form a mesh, such that the meshed structure contributes to the noise absorption function.

20 Claims, 4 Drawing Sheets

(56) References Cited

U.S. PATENT DOCUMENTS 4,566,558 A * 1/1986 Link et al. .................... 181/210
4,702,046 A    10/1987 Haugen et al.
4,706,422 A * 11/1987 Ashton .......................... 52/145
4,989,688 A     2/1991 Nelson

FOREIGN PATENT DOCUMENTS

| EP | 1 792 725 A1 | 6/2007 |
| FR | 2 896 331 A1 | 7/2007 |
| JP | 5-46180 A | 2/1993 |

* cited by examiner

SOUNDPROOFING PANEL

FIELD OF THE INVENTION

The present invention relates to an acoustic insulation panel.

This type of panel is used for the acoustic insulation of one environment relative to another, for example between an engine and a cabin designed to accommodate passengers. These panels can be used in helicopters, aircraft, motor vehicles, buildings or premises in which acoustic insulation is necessary.

BACKGROUND OF THE INVENTION

Several types of insulating systems exist. A first type comprises several thicknesses, the last of which consists of a cladding panel or "facing panel". It is often difficult to make the various thicknesses of materials hold together, notably when they are glass fiber or foam layers. Moreover, when this stack is produced, its mechanical strength is usually insufficient for the attachment of other elements.

To solve this problem, acoustic systems have been proposed comprising two rigid facing panels between which an acoustic insulating material is placed. Such a system is, for example, described in document WO 2007/080335. However this solution has three main drawbacks: the rigidity provided by the second facing panel is not always sufficient to confer the rigidity required for the desired use. Moreover, these acoustic systems have insulation "gaps" at certain noise frequencies. Finally, the second facing panel does not significantly improve the absorption of the noise, unless very thick facings are chosen, which can be a disadvantage in terms of space requirement, weight and costs.

In order to improve the rigidity of the foregoing structures, a proposal has already been made, in document JP 10037341, to interpose between the two facing panels a meshed rigid structure arranged to keep the two facing panels apart from one another in a rigid manner and so that acoustic absorbent material can be inserted between the two facing panels and through the mesh structure. This mesh structure consists of two flat meshes each attached to a single facing panel and separated by corrugated connecting elements attached to the two flat meshes. This structure is made up of rigid metal rods and makes it possible to reduce the mechanical transmission between the absorbent material and the facing panels. The acoustic absorption is slightly improved but to the detriment of the weight of the insulation panel. Moreover, the acoustic absorption function is provided only by the material placed between the two facing panels and in the mesh structure, the use of such a material already being known for this function. Finally, rigidity is only slightly improved.

SUMMARY OF THE INVENTION

The object of the invention is to improve the acoustic insulation panels of the prior art by proposing an insulation panel that is rigid, light and of which the acoustic absorption performance is improved by virtue of the use of a mesh structure helping with the noise absorption function.

For this purpose, the subject of the present invention is an acoustic insulation panel comprising two facing panels separated by a solid structure that is substantially flat and has two faces that are substantially flat and parallel, each of them being secured to a facing panel, said structure comprising through-holes forming a mesh so that the mesh structure helps with the noise-absorption function.

According to other embodiments:
- the mesh structure may also comprise at least one acoustic absorbent material;
- the mesh structure may comprise at least one layer of an acoustic absorbent material;
- the mesh structure may have polygonal meshes;
- the mesh structure may have square meshes;
- the mesh structure may have circular meshes;
- the meshes may have edges that are substantially perpendicular to the two substantially flat and parallel faces of the mesh structure;
- the facing panels may be hollow;
- an acoustic absorption block may be placed inside at least one mesh of the mesh structure;
- said at least one acoustic absorption block may comprise an acoustic absorbent material placed in at least one layer parallel to the facing panels;
- the acoustic absorption block may comprise a layer of a material and with dimensions chosen to resonate at a determined frequency;
- the facing panels may have a respiration frequency and the material and the dimensions of the layer of the acoustic absorption block may be chosen to resonate substantially at the respiration frequency;
- several blocks of which the material and the dimensions of the layer have been chosen to resonate at different frequencies may be placed inside the mesh structure in order to increase the acoustic insulation of the panel at said frequencies;
- the mesh structure may have a density greater than 150 $kg/m^3$, preferably of between 150 and 2000 $kg/m^3$, typically between 150 and 750 $kg/m^3$;
- the mesh structure may have a height of between 10 and 200 millimeters, preferably between 10 and 100 millimeters, typically between 10 and 50 millimeters;
- the mesh structure may be chosen from a carbon-epoxy composite with three layers of four plies each, each layer being separated by a layer of a material selected from the group consisting of a polyurethane foam, a closed-cell rubber foam, a thermoplastic material, wood, a composite material selected from the group formed by glass-epoxy and glass phenolic;
- the material of the facing panels is chosen from glass-epoxy, glass phenolic, polychloroprene, carbon-epoxy, aluminum, rubber and silicones;
- the acoustic absorbent material of the acoustic absorption block may be chosen from melamine foam, polyurethane, glass fiber, polyimides and fibrous materials;
- the material of the layer of the acoustic absorption block, chosen to resonate at a determined frequency, may be chosen from aluminum, rubber, silicones, carbon-based composites, glass, an epoxy resin and a phenolic resin; and
- the acoustic insulation panel may comprise, facing at least one of the through-holes forming the mesh of the structure, at least one aperture in a facing panel, of diameter and with a neck height chosen to absorb a determined wavelength.

The invention also relates to an acoustic absorption block designed to be placed in a mesh of an acoustic insulation panel as above, the block comprising at least one composite consisting of a first layer of acoustic absorbent material, on which is placed a second layer of a material and of dimensions chosen to resonate substantially at a determined frequency, on which a third layer of acoustic absorbent material is placed.

According to other embodiments:
the determined frequency may be substantially the respiration frequency of the facing panels of the acoustic insulation panel in which it is designed to be placed; and
the acoustic absorbent material may be chosen from melamine foam, polyurethane, glass fiber, polyimides and fibrous materials. The material of the layer of the acoustic absorption block, chosen to resonate at a determined frequency, may be chosen from aluminum, rubber, silicones, carbon-based composites, glass, an epoxy resin and a phenolic resin.

BRIEF DESCRIPTION OF THE DRAWINGS

Other features and advantages of the invention will appear on reading the detailed description of exemplary embodiments, in association with the appended drawings which represent respectively:

FIG. 3, a schematic view in perspective of an additional noise-attenuation device;

FIG. 8, a schematic view in section according X-Y directions of FIG. 1 of an embodiment of an acoustic insulation panel according to the invention.

DETAILED DESCRIPTION OF THE INVENTION

Figure 1:
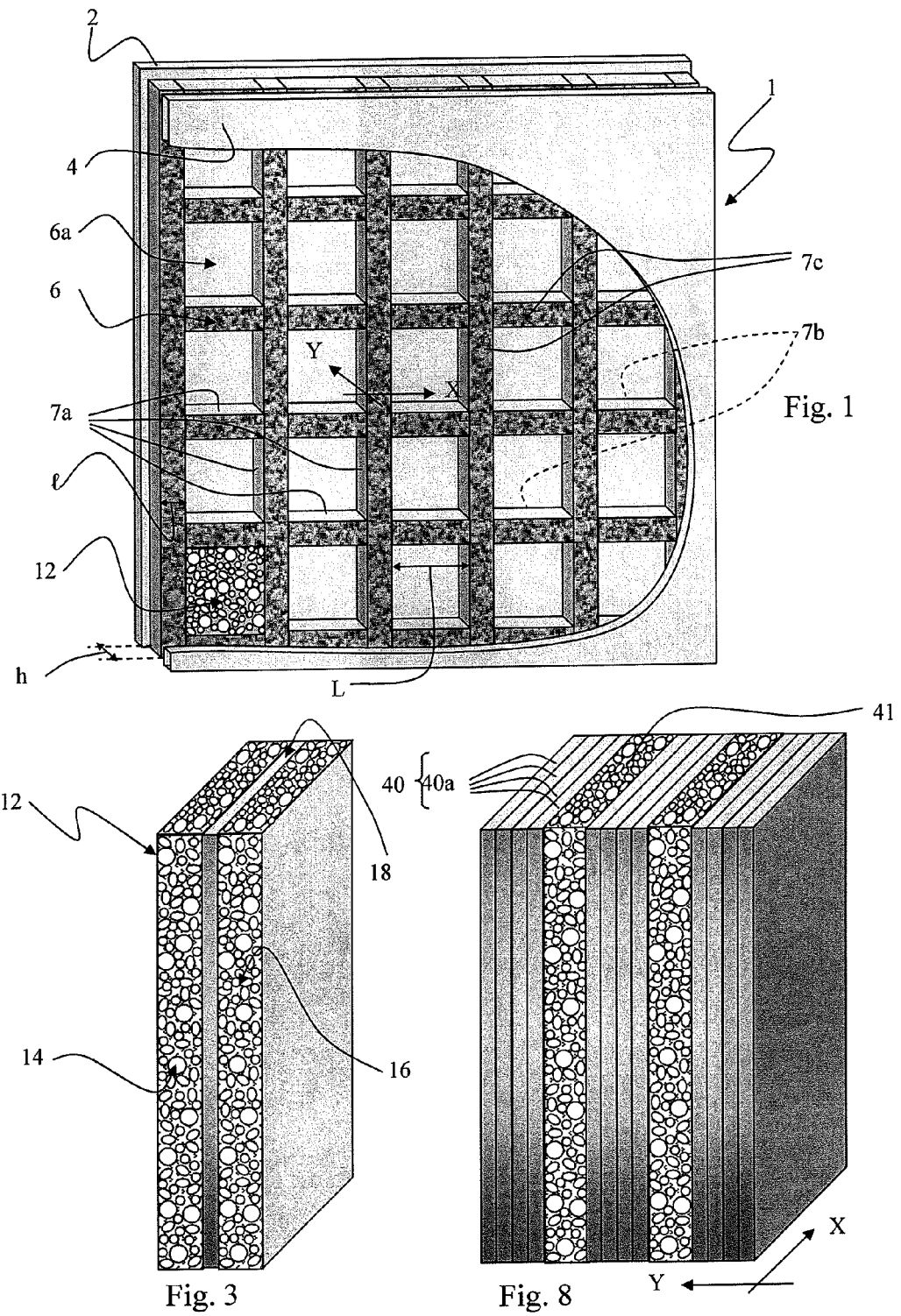
FIG. 1, a schematic view in perspective of an insulation panel according to the invention.

One embodiment of an insulation panel according to the invention is shown in FIG. 1. It comprises two facing panels 2 and 4 between which is placed a solid mesh structure 6 that is substantially flat and has two faces 7b, 7c that are substantially flat and parallel secured to the two facing panels 2 and 4. Preferably, the mesh structure comprises at least one layer of an acoustic absorbent material, this layer preferably being placed parallel to the facing panels. The mesh structure may be made of various materials, such as dense closed-cell foams. According to a preferred embodiment, the mesh structure consists of at least one composite of carbon-epoxy with three layers of four plies each, with polyurethane foam between each layer. According to another embodiment, the mesh structure consists of closed-cell rubber foams, with a density equal to 150 kilograms per cubic meter ($kg/m^3$). More generally, the mesh structure is chosen to have a density of more than 150 $kg/m^3$ and not exceeding 2000 $kg/m^3$.

The structure 6 comprises through-holes 6a forming a mesh, the meshes 6a preferably being square. They thus have edges 7a that are substantially perpendicular to the faces 7b and 7c of the mesh structure and perpendicular to the facing panels 2 and 4 to which the faces 7b and 7c are secured.

Figure 2:
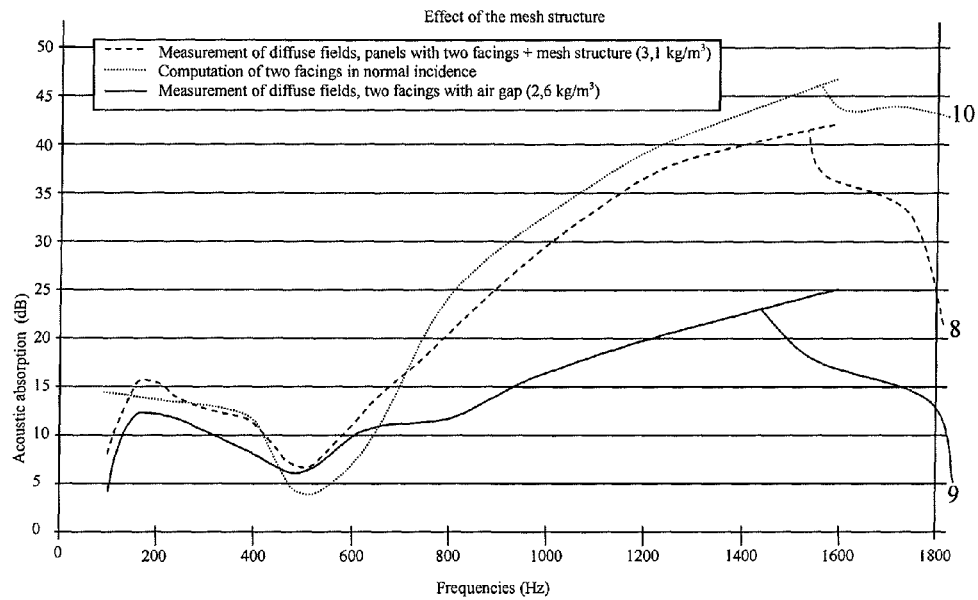
FIG. 2, a graph showing the effect of the mesh structure according to the invention on the effectiveness of attenuation of a panel as a function of various noise frequencies.

As the graph of FIG. 2 shows, the presence of the above mesh structure between two facing panels improves the acoustic absorption of the panel according to the invention (dashed line 8) compared with a panel of known type (solid line 9) consisting of two facing panels between which there is an air gap. This improvement may be as much as 168% for a noise with a frequency of 1600 Hz. Specifically, when an insulation panel of the known type absorbs 25 decibels at 1600 Hz, a panel 1 according to the invention absorbs approximately 42 decibels.

Furthermore, by comparing the absorption curve of a panel 1 according to the invention subjected to an acoustic excitation of diffuse type (dashed line 8) with a theoretical curve computed for an insulation panel of known type subjected to an acoustic excitation the incidence of which is normal to the panel (dotted line 10), it is noticeable that the mesh structure has the effect of "rectifying" the acoustic excitation of diffuse type and of acting as if the panel were excited with a normal incidence. In other words, the presence of the flat mesh structure between the two facing panels has the effect of "polarizing" the acoustic field by transforming a field of diffuse type into a field of a type substantially normal to the panel 1. Doing so, the flat mesh structure significantly increases the acoustic absorption performance of the panel.

According to another aspect of the invention, an additional acoustic absorption device can be placed inside one or more meshes of the mesh structure, and preferably all the meshes of the structure, in order to improve the absorption performance of the acoustic insulation panel. Such a device may consist of any known acoustic absorbent material.

A preferred embodiment of such an additional acoustic absorption device according to the invention is shown in FIG. 3. It consists of an acoustic absorption block 12 comprising two layers 14-16 of acoustic absorbent material, between which is placed a layer 18 of a material and with dimensions chosen to resonate substantially at a determined frequency. This frequency is preferably the respiration frequency of the facing panels 2 and 4 (see FIG. 1). The respiration frequency of the two facing panels 2 and 4 corresponds to the frequency at which the acoustic insulation panel attenuates noise the least. This frequency, for a double wall, is computed as follows:

$$f_R = \frac{1}{2\pi} \times \sqrt{\frac{\rho_0 \times (\rho_{S1} + \rho_{S2}) \times c^2}{d \times \rho_{S1} \times \rho_{S2}}}$$

Where:
$\rho_0$ is the density of the air;
$\rho_{S1}$ and $\rho_{S2}$ are the surface density of each of the facing panels;
c is the speed of sound in the air;
d is the distance between the two facing panels.

Figure 4:
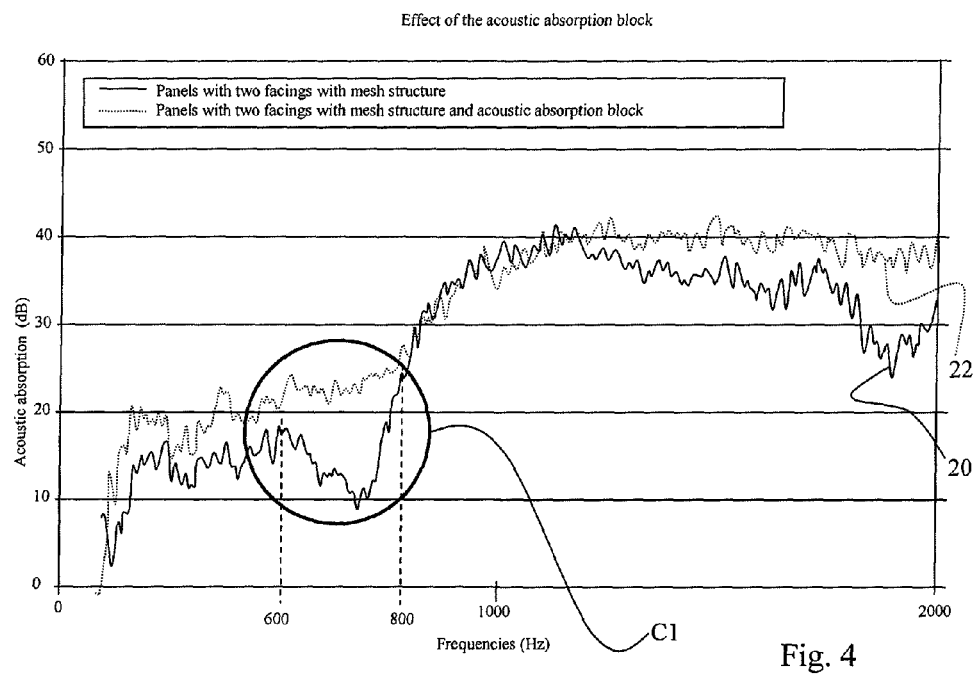
FIG. 4, a graph illustrating the effect of the additional acoustic absorption device of FIG. 3 on the noise absorption rate as a function of various noise frequencies.

This frequency corresponds to a lesser absorption of noise. This phenomenon is illustrated in FIG. 4 where it is possible to observe that an acoustic insulation panel according to the invention comprising two facing panels and a mesh structure (solid line 20) has a quality of noise attenuation that is less for noise frequencies from approximately 600 Hz to approximately 800 Hz.

If this frequency corresponds to the resonance frequency of one of the facing panels, this phenomenon of reducing the acoustic absorption can be yet more marked as a function of the vibration mode of the panels.

The Applicant has found that, by filling the meshes of the mesh structure with acoustic absorbent material in which is placed a layer of a material and with a dimension chosen to resonate in the frequency band of the facing panels, the absorption performance of the acoustic absorption panel does not reduce and is compensated for by the blocks. This is illustrated in FIG. 4.

Two identical acoustic absorption panels have been produced and comprise:
- a first facing panel made of glass-epoxy with two plies 0.6 mm thick and a second facing panel made of polychloroprene 0.6 mm thick, and
- a flat mesh structure with a height h of 18 mm inserted between the two facing panels.

The mesh structure is made (see FIG. 8) of carbon-epoxy composite with three layers 40 of four plies 40a each, a layer 41 of polyurethane foam being inserted between two layers of carbon-epoxy composite. The mesh structure has a height h of 18 mm, square meshes of approximately 90 mm with a side L and faces 7b, 7c 10 millimeters wide l. More generally, the width l of the faces 7b and 7c is suitable for allowing an effective attachment of the facing panels. Preferably, this width l is between 1 and 20 millimeters.

Inside the meshes of one of the acoustic insulation panels thus produced, acoustic absorption blocks according to the invention are placed. More precisely, each acoustic absorption block comprises a first layer of 9 mm of melamine (the layer 14 of FIG. 3), a layer 0.5 mm thick of aluminum (layer 18 of FIG. 3) and a second layer of melamine 6 mm thick. All this is bonded to the face of the facing panel made of glass-epoxy. The aluminum layer 0.5 mm thick resonates at approximately 650 Hz.

The circle C1 of FIG. 4 shows the effect, on the dip in attenuation around the resonance frequency, of acoustic absorption blocks in a panel according to the invention, compared with a similar panel without said blocks. When these two panels are subjected to a noise of variable frequency (see FIG. 4), it is found that the first panel, with no acoustic absorption block, has a dip in attenuation of between approximately 600 Hz and 800 Hz, while the panel furnished with acoustic absorption blocks has no dip in noise attenuation (see the dotted line 22).

The material and the dimensions of the layer 18 may be chosen to resonate at a determined frequency that differs from the resonance frequency.

It can also be envisaged to have, inside the mesh structure of an acoustic insulation panel according to the invention, different blocks, the material and dimensions of the layer of which have been chosen to resonate at different frequencies. This makes it possible to increase the acoustic insulation of the panel at said various frequencies.

It is therefore possible to configure the insulation panel according to its use and the specific environment in which it is to be installed.

Figure 5:
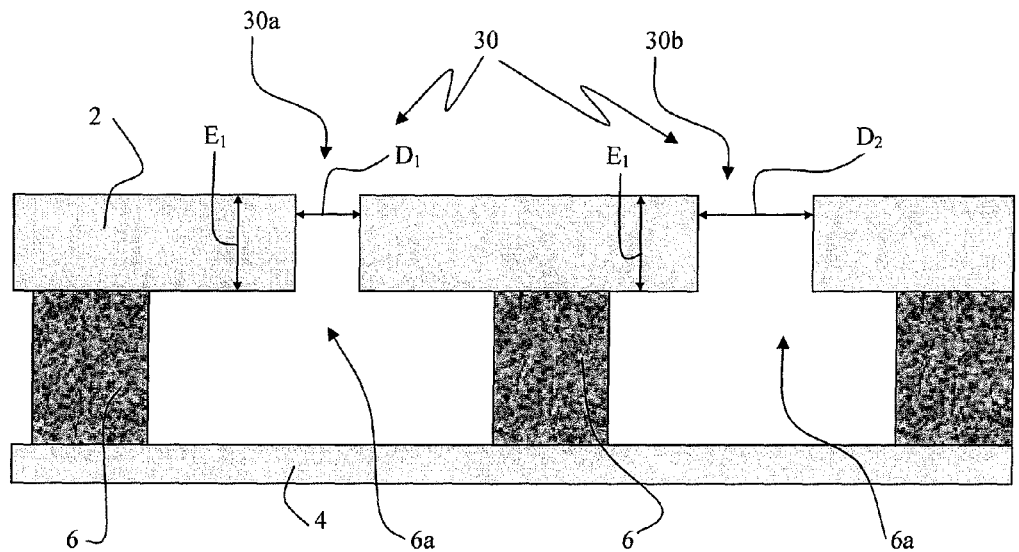
FIGS. 5 and 6, schematic views in section of an acoustic insulation panel according to the invention of which one facing panel supports resonators for the absorption of determined noise frequencies.
Figure 6:
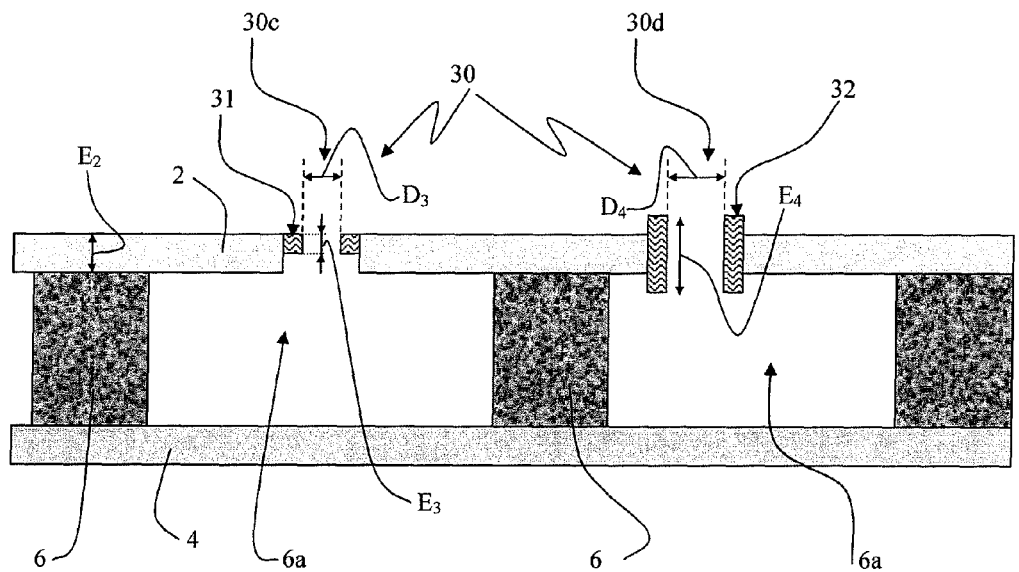

According to another aspect of the invention, illustrated in FIGS. 5 and 6, the acoustic insulation panel according to the invention comprises at least one acoustic resonator 30 comprising an aperture in a facing panel 2 facing one of the through-holes 6a forming the mesh of the structure 6. The resonator makes it possible to absorb a determined wavelength and, preferably, the respiration wavelength.

The neck length E and the diameter D of the aperture of each resonator are chosen as a function of the wavelength to be absorbed.

According to a first embodiment, illustrated in FIG. 5, it is possible to choose a facing panel of a determined thickness $E_1$ equal to the desired neck length, then to produce apertures 30a, 30b of different diameters $D_1$, $D_2$ to absorb different wavelengths.

So as not to make the insulation panel according to the invention heavy by choosing a thick facing panel, a second embodiment, illustrated in FIG. 6, consists in producing a facing panel with a thickness $E_2$, apertures 30c, 30d in which are inserted tubes 31, 32 with an appropriate length $E_3$, $E_4$ and diameter $D_3$, $D_4$. In the example illustrated, $E_3$ is smaller than $E_2$ and $E_4$ is greater than $E_2$.

In the examples described, the apertures have a circular section, but other shapes could be envisaged.

Preferably, several of the above resonators 30 are placed opposite each through-hole 6a of the structure 6. Also, the two facing panels 2-4 can support resonators.

The invention is not limited to the exemplary embodiments described and shown.

Figure 7:
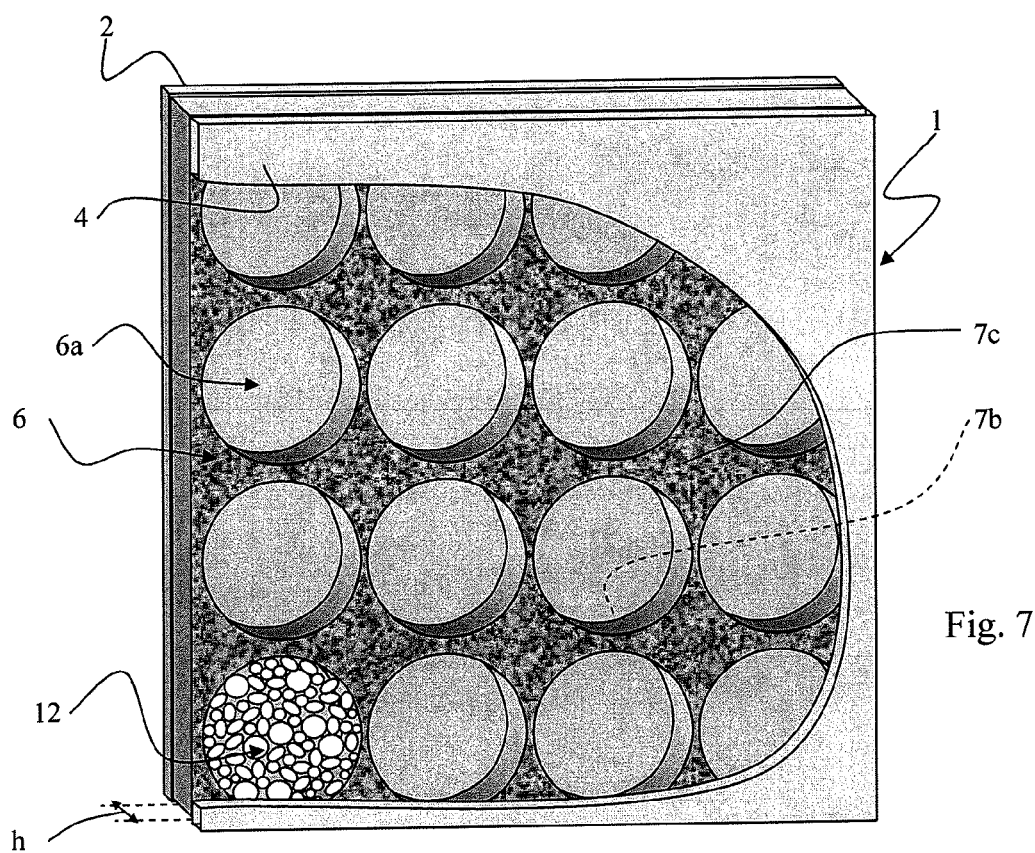
FIG. 7, a schematic view in perspective of an insulation panel according to the invention with circular meshes.

According to other embodiments:
- the meshes may be of different shapes: polygonal (hexagon or octagon for example) or circular shapes (see FIG. 7);
- the facing panels may be hollow in order to lighten the acoustic insulation panel. In this case, the phenomena of respiration can be increased, and it is then desirable to add acoustic absorption blocks in the meshes of the mesh structure;
- the mesh structure may have a density of more than 150 kg/m$^3$, preferably of between 150 and 2000 kg/m$^3$, typically between 150 and 750 kg/m$^3$;
- the mesh structure has a height of between 10 and 200 millimeters, preferably between 10 and 100 millimeters, typically between 10 and 50 millimeters;
- the mesh structure may be chosen from a closed-cell rubber foam, a thermoplastic material, wood, a composite material selected from the group consisting of glass-epoxy and glass phenolic;
- the material of the facing panels may be chosen from glass-epoxy, glass phenolic, polychloroprene, carbon-epoxy, aluminum, rubber and silicones;
- the acoustic absorbent material of the acoustic absorption block may be chosen from melamine foam, polyurethane, glass fiber, polyimides and fibrous materials;
- the resonant material of the acoustic absorption block may be chosen from aluminum, rubber, silicones, carbon-based composites, glass, an epoxy resin and a phenolic resin;
- the thickness of the acoustic insulation panel may be chosen to be between 15 and 100 mm. The thicker the panel becomes the more the respiration frequency reduces;
- in the case of a grid of rubber foam, it is the facing panels which provide the rigidity necessary for the strength of the panel. The surface density of the facing panels influences the final performance. Therefore, the greater the surface density of the panels, the better the noise attenuation. However, the greater the surface density of the panels, the more the respiration frequency reduces.

The acoustic insulation panel according to the invention has a quality of noise attenuation that is significantly improved compared with the acoustic insulation panels of the prior art. It therefore allows an acceptable absorption with a light panel comprising simply two facing panels and a flat mesh structure.

If weight is not a limiting factor and/or the effectiveness of noise absorption must be optimized, acoustic absorption blocks can be placed in the meshes of the structure.

If rigidity is not a limiting factor, the mesh structure may simply consist of a foam with a density greater than or equal to 150 kg/m$^3$ and not exceeding 2000 kg/m$^3$.

The acoustic absorption block 12 according to the present invention may be used to improve the effectiveness of acoustic insulation panels of the prior art. It may, for example, be used in the panel according to document WO 2007/080335 instead of the light granular material or in the panel according to document JP 1037341 between the rigid metal rods of the three-dimensional mesh structure placed between the facing panels.

The panels according to the invention can be used preferably in the rear partitions for helicopters, the floors for helicopters or any other cladding panel, cladding panels for aircraft, etc.

The invention claimed is:

1. An acoustic insulation panel comprising two rigid facing panels having a respiration frequency, said facing panels being separated by a solid structure that is substantially flat and has two faces that are substantially flat and parallel, each of them being secured to a facing panel, said structure comprising through-holes forming a mesh, so that the mesh structure helps with the noise-absorption function, an acoustic absorption block being inserted inside at least one mesh of the mesh structure characterized in that said acoustic absorption block comprises at least one layer, parallel to the facing panels, of an acoustic absorbent material and a layer, parallel to the facing panels, of a material and with dimensions chosen to resonate substantially at the respiration frequency.

2. The acoustic insulation panel as claimed in claim 1, wherein the mesh structure also comprises at least one acoustic absorbent material.

3. The acoustic insulation panel as claimed in claim 2, wherein the mesh structure comprises at least one layer of an acoustic absorbent material.

4. The acoustic insulation panel as claimed in claim 1, wherein the mesh structure has polygonal meshes.

5. The acoustic insulation panel as claimed in claim 4, wherein the mesh structure has square meshes.

6. The acoustic insulation panel as claimed in claim 1, wherein the mesh structure has circular meshes.

7. The acoustic insulation panel as claimed in claim 1, wherein the meshes have edges that are substantially perpendicular to the two substantially flat and parallel faces of the mesh structure.

8. The acoustic insulation panel as claimed in claim 1, wherein the facing panels are hollow.

9. The acoustic insulation panel as claimed in claim 1, wherein several blocks, of which the material and the dimensions of the layer have been chosen to resonate at different frequencies, are placed inside the mesh structure in order to increase the acoustic insulation of the panel at said frequencies.

10. The acoustic insulation panel as claimed in claim 1, wherein the mesh structure has a density selected from the group consisting of greater than 150 kg/m$^3$, between 150 and 2000 kg/m$^3$, and between 150 and 750 kg/m$^3$.

11. The acoustic insulation panel as claimed in claim 1, wherein the mesh structure has a height (h) selected from the group consisting of between 10 and 200 millimeters, between 10 and 100 millimeters, typically between 10 and 50 millimeters.

12. The acoustic insulation panel as claimed in claim 1, wherein the mesh structure is chosen from a carbon-epoxy composite with three layers of four plies each, each layer being separated by a layer of polyurethane foam, a closed-cell rubber foam, a thermoplastic material, wood, a composite material selected from the group formed by glass-epoxy and glass phenolic.

13. The acoustic insulation panel as claimed in claim 1, wherein the material of the facing panels is chosen from glass-epoxy, glass phenolic, polychloroprene, carbon-epoxy, aluminum, rubber and silicones.

14. The acoustic insulation panel as claimed in claim 1, wherein the acoustic absorbent material of the acoustic absorption block is chosen from melamine foam, polyurethane, glass fiber, polyimides and fibrous materials.

15. The acoustic insulation panel as claimed in claim 1, wherein the material of the layer of the acoustic absorption block, chosen to resonate at the respiration frequency, is chosen from aluminum, rubber, silicones, carbon-based composites, glass, an epoxy resin and a phenolic resin.

16. An acoustic absorption block designed to be placed in a mesh of an acoustic insulation panel as claimed in claim 1, characterized in that it comprises at least one composite consisting of a first layer of acoustic absorbent material, on which is placed the layer of the material and dimensions chosen to resonate substantially at the respiration frequency, on which a third layer of acoustic absorbent material is placed.

17. The acoustic absorption block as claimed in claim 16, wherein the acoustic absorbent material is chosen from melamine foam, polyurethane, glass fiber, polyimides and fibrous materials, and the material of the layer of the acoustic absorption block, chosen to resonate at the respiration frequency, is chosen from aluminum, rubber, silicones, carbon-based composites, glass, an epoxy resin and a phenolic resin.

18. An acoustic insulation panel, comprising:
two facing panels having a respiration frequency;
a solid structure positioned between and separating said facing panels; said solid structure is substantially flat and has two faces that are substantially flat and parallel, each of the two faces being secured to a respective facing panel; said structure further comprising through-holes forming a mesh, so that the mesh structure helps with the noise-absorption function;
an acoustic absorption block positioned inside at least one mesh of the mesh structure, said acoustic absorption block comprises (i) at least a first layer and a second layer, each being parallel to the facing panels, each comprising an acoustic absorbent material and (ii) a third layer, that is parallel to the facing panels, comprising dimensions and a material which enable the third layer to resonate substantially at the respiration frequency, said material of the third layer is different from that of the acoustic absorbent material; said third layer being positioned between said first and second layers.

19. The acoustic absorption block as claimed in claim 18, wherein the acoustic absorbent material of the first layer and the second layer are the same.

20. The acoustic absorption block as claimed in claim 18, wherein the acoustic absorbent material of the first layer and the second layer are different.

* * * * *